Figure 1:
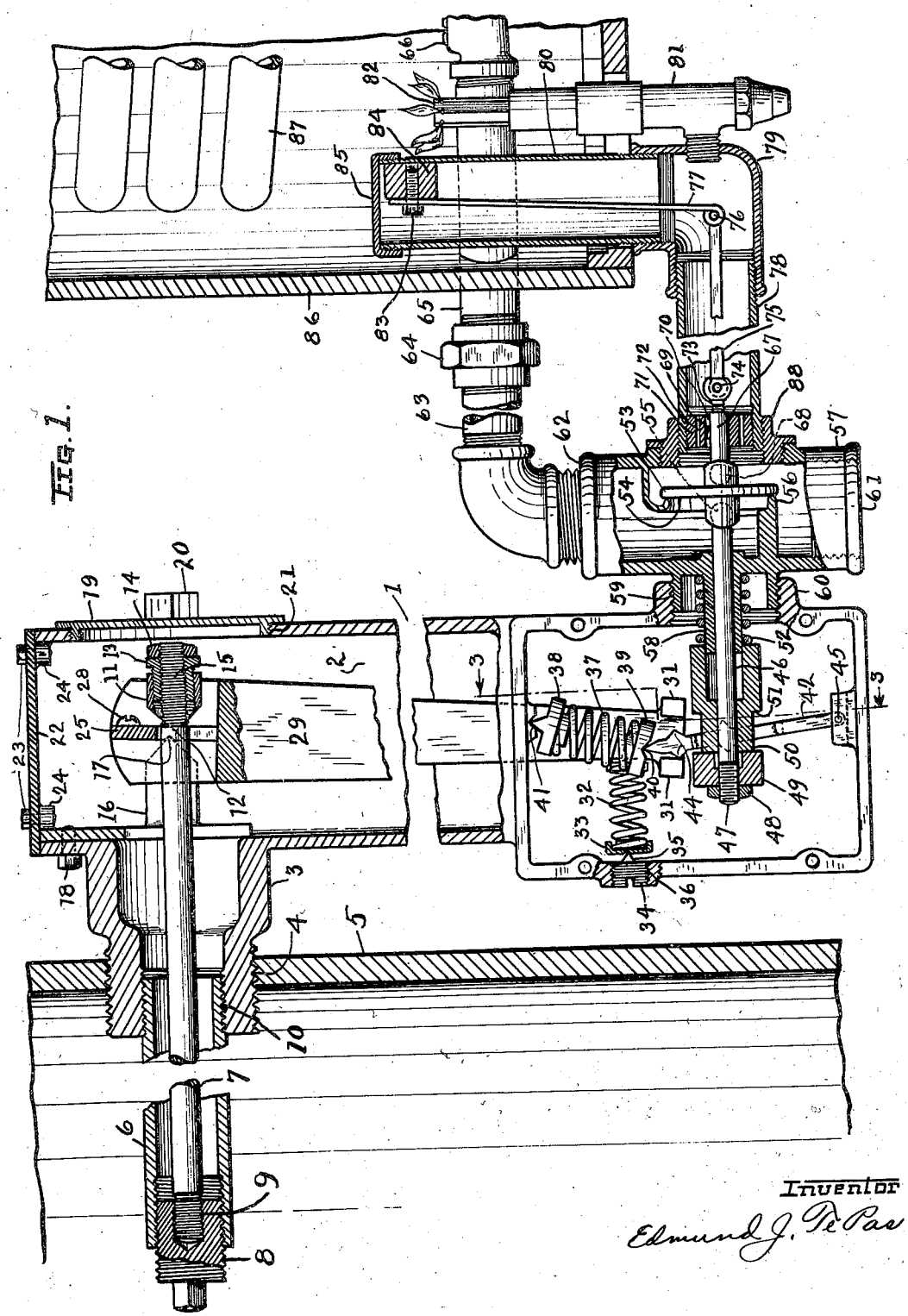

July 4, 1933.  E. J. TE PAS  1,917,075
GAS BURNER CONTROL
Filed April 21, 1928   2 Sheets-Sheet 1

Inventor
Edmund J. Te Pas

July 4, 1933.  E. J. TE PAS  1,917,075

GAS BURNER CONTROL

Filed April 21, 1928  2 Sheets-Sheet 2

Inventor.
Edmund J. Te Pas

Patented July 4, 1933

1,917,075

UNITED STATES PATENT OFFICE

EDMUND J. TE PAS, OF LAKEWOOD, OHIO, ASSIGNOR TO THE PATROL VALVE COMPANY, OF CLEVELAND, OHIO, A CORPORATION OF OHIO

GAS BURNER CONTROL

Application filed April 21, 1928. Serial No. 271,801.

This invention relates to gas burning appliances and in particular, automatic controls for the purpose of safely controlling the operation of such appliances.

Prior to my invention it had been the usual practice to control the operation of the burner of a gas burning appliance, such as a storage automatic water heater, by means of a thermostatic valve responsive to the temperature of the water in the storage vessel. Thus when the temperature of the water fell below a certain point the thermostatic valve opened and admitted gas to the main burner.

Ignition means for the burner usually included a constantly burning pilot. In the presence of such a pilot flame the gas issuing from the main burner was ignited and served to raise the temperature of the water to a predetermined point, whereupon the thermostatic valve closed, shutting off the supply of gas to the main burner and preventing further heating of the water.

In this type of arrangement, where the gas is automatically turned on and off and where a pilot light is depended upon for ignition there is the possibility of a hazardous condition arising upon the event of extinguishment of the pilot and the subsequent escape of unburned gas from the main burner.

Efforts to obviate this hazardous condition have in general resulted in the provision of an additional thermostatic valve in the gas line, under control of the pilot light, so that if the pilot light should be extinguished the thermostatic valve controlled thereby would close and cut off the admission of gas to the main burner.

There are several types of thermostatic valves or safety pilots on the market today. These valves differ structurally, but their function and purpose are the same. Their purpose is to prevent the admission to and escape of raw gas from the main burner when the pilot light is not burning.

One of the objects of this invention is to provide, in an appliance of the type described, a gaseous fuel control valve that is responsive to the temperature of the liquid that is being heated and which is independently controlled by the heat of a constantly burning ignition pilot.

Another object of this invention is to provide in a water heater control of the type described, a highly sensitive, quick-acting, rugged thermostat.

Another object of my invention is to provide a gas burner control for water heaters that is fully automatic in its operation, having inbuilt safety features, and being simple and inexpensive to construct and install.

Another object of my invention is to provide a thermostat that makes use of a resilient means in its opening operation and that is positively moved to its closed position without the aid of springs or their equivalent.

Another object of this invention is to provide a thermostat having snap action mechanism to effect the opening and closing of its valve and means independent of the operation of the snap action mechanism to positively close the valve in the event of failure of the snap action mechanism.

Another object of this invention is to provide a thermostat of the type described in which the elements that require accurate machining are of minimum number, small and easily manufactured.

A further object of this invention is to provide a device of the type described in which the elements subject to wear are inexpensive to manufacture and are readily replaceable.

In general my invention contemplates replacing two valves, namely, the tank thermostat and the safety pilot, by a single valve under the joint control of the liquid contents of the storage tank and the pilot light; providing a simple, safe and effective means of controlling the gas flow of a storage automatic water heater.

By this construction a great many parts are eliminated, resulting in a greatly simplified device that is not apt to become inoperative through wear or breakage. The number of parts requiring adjustment is very small. This should materially cut down the production assembly costs as well as reducing servicing after the device has reached the hands of the consumer.

An important advantage of this control is the high factor of safety incidental to its operation. It is impossible to turn on the main burner gas supply without first providing a pilot flame for its ignition.

With the above mentioned and other objects in view, the invention consists in the novel construction, arrangement and combination of parts, hereinafter described, illustrated in some of its embodiments in the accompanying drawings and particularly pointed out in the appended claims.

The present invention includes certain features common to my copending applications Serial Nos. 160,747, filed January 12, 1927, and 271,802 and 271,803 filed April 21, 1928, as well as application Serial No. 3,333 filed January 19, 1925 and application Serial No. 123,561 filed July 19, 1926 by L. F. Doen and W. J. Snow respectively, and such common features are hereby disclaimed in the invention to which the present application relates.

Figure 2:
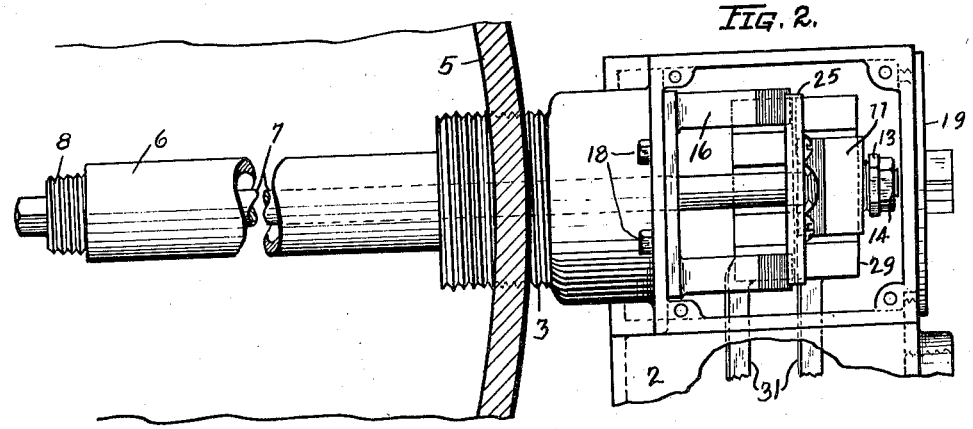
Figure 3:
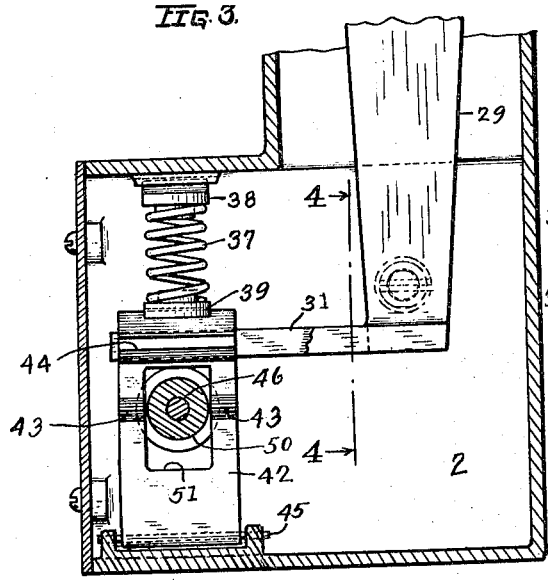
Figure 4:
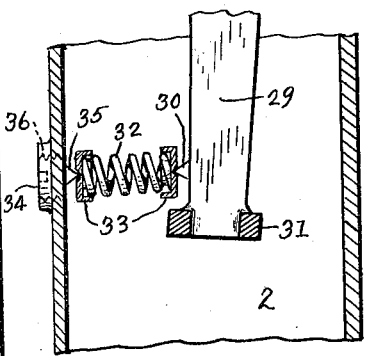
Figure 5:
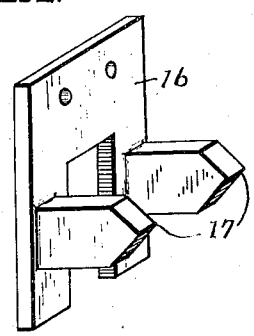
Figure 6:
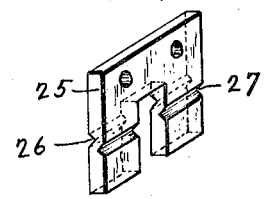

Referring to the appended drawings: Fig. 1 is a side elevational view in section, of a storage automatic water heater illustrating one form of my improved control. Fig. 2 is a plan elevational view of the thermostat with the top cover plate removed. Fig. 3 is a section taken on line 3—3 Fig. 1. Fig. 4 is a section taken on line 4—4 Fig. 3. Fig. 5 is a perspective view of the thermostat fulcrum bearing. Fig. 6 is a perspective view of the knife edge bearing plate of the compounding lever of the thermostat.

Referring to Fig. 1, the numeral 1 indicates a tank thermostat certain of the operating elements of which are housed in the casing 2. The casing 2 is provided with a cover plate 22 at its upper end. A lateral projection 3, externally threaded at 4 is adapted for reception in a tapped opening of the tank 5.

The tank 5 serves as a liquid container for the water heating system, which is of the conventional type comprising a tank or storage vessel in communication at its upper and lower ends with water circulating elements 87 which are adapted to be subjected to heat from the gas burner 66.

The lateral projection 3 of the thermostat casing 2 is internally threaded at 10 for the reception of the thermostat tube 6 which is made of copper or some other metal having a high coefficient of thermal expansion. Housed within the tube 6 is a rod 7 which is made of a metal having a low coefficient of thermal expansion such as Invar or 36% nickel steel. Carbon or porcelain are also commonly used for this purpose.

The rod 7 is externally threaded at 9 for reception in the closure and adjusting plug 8 which is threadedly received in the projection of the tube 6. The end 15 of the rod 7 is externally threaded for reception of the adjustable knife edge bearing member 11 which is internally threaded and adjustably carried by the internally and externally threaded adjusting member 13.

The member 13 is adjustably carried on the threaded end 15 of the rod 7. The outer and inner threads of the member 13 are of different pitch so that by turning the member 13 the bearing member 11 moves a distance proportional to difference in pitch of the inner and outer threads of the member 13 and a fine adjustment may be had on the knife edge bearing member 11 which it carries. A lock nut 14 holds the element 13 in the desired adjustment.

A fulcrum bearing member 16 carried by the casing 2, is located opposite to the member 11 with the center line of its knife edge bearing 17 slightly above center line of the knife edge 12. The element 16 is secured to the casing 2 by bolts or cap screws 18 and serves as a rigid abutment and fulcrum bearing for the movement-compounding lever 29. Access to the adjustable knife edge bearing member 11 is had by way of the removable plug 19 which is provided with a wrench engaging extension 20, and is threadedly received in the tapped opening 21 of the housing 2.

The compounding lever 29 is carried at its upper end between the knife edges 12 and 17 and is provided with a hardened steel bearing plate 25 secured thereto in any suitable manner, such as the screws 28. The bearing plate 25 is provided with bearing grooves 26 and 27 for the reception of the knife edges 17 and 12, respectively. The spacing of the grooves 26 and 27 determines the amount of the movement of the lower end of the compounding lever 29 for a given change in temperature of the medium which the thermostat is in contact with.

The lower end of the compounding lever 29 has formed thereon a pair of lateral extensions 31 forming a fork which serves to shift the snap-over mechanism of the valve. A compression spring 32 is compressed and supported between the conical extension 30 formed on the lower end of the lever 29 and the pointed end 35 of the adjustable screw 34 which is received in a suitably threaded opening 36 formed in the casing 2.

The spring 32 is provided with bearing caps 33 which are in contact with the conical bearings 30 and 35 respectively. The spring 32 serves to shift the lever 29 to the right, as viewed in Fig. 1, upon the cooling of the thermostat, its motion to the left being effected by the differential expansion of the rod 7 and tube 6 upon the heating of these parts.

A snap action mechanism, comprising, a pair of oscillating levers, one of which is expansible, is provided for actuation of the valve controlled by the thermostat. The expansible lever of the snap action mechanism comprises a spring 37 compressed between the upper and lower abutments 38 and 39 respectively which make a line-contact with a suitable bearing groove 47 in the casing 2 and the knife edge 40, of the lever 42.

The lever 42 is provided with a knifed edge 40 at its upper end and at its lower end it is pivotally secured at 45 to the housing 2. The lever 42 is provided with laterally extending contact edges 44 which are positioned between the laterally extending arms 31 of the compounding lever 29 and adapted for contact therewith.

The lever 42 is provided with a rectangular opening 51 for reception of the valve tappet 50. The valve tappet 50 is centrally bored for reception of the valve stem 46 and the cylindrical extension 58 of the valve body, and is slidably carried thereby. A compression spring 52 is provided to urge the tappet 50 to the left as viewed in Fig. 1.

The valve stem 46 is journaled in the lateral extension 58 of the valve casing, and is provided with an internally threaded disk 49 which is adjustably mounted on the threaded end 47 of the valve stem. The disk 49 is locked in the desired position by the nut 48. The lateral contact edges 43, provided on the lever 42 are adapted to make contact at times with the side of the disk 49 and at other times with the face 51 of the valve tappet 50.

A valve head 53 is mounted on the inner end of the valve stem 46 by means of a ball and socket joint 55. The valve head 53 cooperates with a valve seat 56 integrally formed in the valve body 57. The valve seat engaging face 54 of the valve head 53 may be faced with a yielding material such as leather to insure at all times a leak proof valve when it is in its closed position.

The valve body 57 is provided with internally threaded inlet and outlet openings 61 and 62 respectively. The inlet opening 61 is adapted to be connected to a source of gaseous fuel supply. The outlet end 62 of the valve body is internally threaded for reception of an elbow that carries the conduit 63 which is in turn connected by a union 64 and a conduit 65 to the main heating burner 66.

The valve head 53 is provided with a ball and socket joint 68 opposite to and of similar construction to the joint 55. The joint 68 connects the valve head to a rod 67 that is internally bored and threaded for reception of the externally threaded rod 73. The rod 73 is pivotally connected at 74 to the connecting rod 75 which is in turn pivotally connected at 76 to the lower or free end of a thermostatic element 77.

The element 77 is a composite laminated metallic strip, formed by suitably securing together two sheets of metal differing in their thermal expansion, such as brass and steel, so that the strip so formed has the property of changing its shape with changes in temperature.

Thermostatic elements of the above type are old and well known and may be obtained from several different manufacturers in this country. For high temperatures as are apt to be encountered in this device it is possible to obtain a thermostatic metal that does not use brass replacing this side of the element with a ferrous alloy having a high coefficient of expansion.

The valve body 57 has an internally threaded side opening for reception of the externally and internally threaded bushing 88. The bushing 88 threadably receives the conduit 78 which is in turn received in the elbow 79. A centrally bored bearing member 71 is carried by the conduit 78 and serves as a bearing for the rod 67.

The rod 67 is provided with a key 69 which slides in a suitable groove 70 cut in the bearing member 71. The bearing member 71 is further provided with passages 72, the function of which is to provide a gas passageway for the fuel supply of the constantly burning ignition pilot 82. The flame of the pilot 82 is used to ignite the main burner 66 when gas is admitted to it and also serves to maintain the thermostatic strip 77 in a heated and consequently distorted position.

The thermostatic strip 77 is housed in a tube 80 and is secured in the upper end of this tube to a block 84 by means of the bolt or cap screw 83. A closure cap 85 is provided for the upper end of the tube 80.

Fig. 1 shows the elements of my improved control in the position they occupy when the temperature of the water in the tank 5 is at or above the temperature for which the thermostat is adjusted and which condition has caused the gas supply to the burner 66 to be cut off. Upon cooling of the water, the rod and tube 7 and 6 contract unequal amounts by reason of their different coefficients of expansion, allowing the spring 32 to shift the lever 29 to the right.

When this action takes place one of the forked ends 31 of the lever 29 engages the lever 42 carrying it to the right. When the lever 42 passes its dead-center or vertical position the spring 37 snaps it to its extreme right hand position shifting the valve tappet 50 away from the disk 49, allowing the hot thermostatic strip 77 to snap the valve head 53 to the open position. In this manner gas is admitted to the burner 66 where it is ignited by the pilot 82.

In the action described above, it is to be noted that the opening of the valve is accomplished by the heated strip 77 the heated condition and operation of which is dependent upon the presence of the ignition pilot 82 that lights the main burner. In the absence of an iginition pilot flame it is impossible to open the main gas supply. When the thermostatic strip 77 is at ordinary room temperature it tends to urge the valve head against its seat 56.

As the temperature of the water in the tank 5 increases it causes the lever 29 to swing to the left carrying with it the snap action mechanism. When the elements of the snap action mechanism pass their neutral position they snap to the left. The lever 42 engages the disk 49 moving it and its associated valve head and valve stem to closed position cutting off the gas supply to the burner 66. The closing of the valve at such times when the pilot 8 is burning is accomplished in opposition to the force exerted by the thermostatic strip 77.

In the event of breakage of the spring 37, further heating of the water causes the lever 29 to swing to the left until it pushes the lever 42 and the associated valve parts to closed position. By this arrangement a positive closure is provided for the main gas valve in case of failure of the snap action mechanism.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

I claim:

1. The combination of a main heating gas burner having a source of gas supply therefor and a valve comprising a valve body having an inlet and outlet opening and a valve port formed therebetween, said outlet opening being connected to said main heating burner and said inlet opening being adapted to be connected to said source of gas supply, a valve member cooperating with said valve port to control gas flow therethrough, a thermostatic device directly connected to said valve member, snap action means operatively associated with said valve member, and thermostatic means independent of said thermostatic device comprising a temperature responsive rod and tube having different coefficients of thermal expansion, and a fulcrum lever in operative engagement with said rod at one end and at its other end in operative engagement with said snap action mechanism for effecting the operation of said valve.

2. A thermostatically controlled valve comprising, a valve body having a valve port formed therein, a valve member cooperating with said valve port, a pair of valve stems connected to the opposite sides of said valve member, thermostatic means directly connected to one of said valve stems, and thermostatic means independent of said first named thermostatic means adapted to engage the other of said valve stems to move said valve member to its closed position.

3. A thermostatically controlled valve comprising, a valve body having a valve port formed therein, a valve member cooperating with said valve port, valve stems connected to the opposite sides of said valve member, thermostatic means directly connected to one of said valve stems, and thermostatic means independent of said first named thermostatic means adapted to engage the other of said valve stems to move said valve member with a snap motion to its closed position.

4. A thermostatic valve comprising, a valve body having a valve port formed therein, a valve members cooperating with said valve port, a valve stem connected to said valve member, snap action means associated with said valve stem to effect the operation of said valve member, thermostatic means to shift said snap action mechanism past its neutral position said means functioning at times to positively move said snap action mechanism, valve stem and valve head to a closed position, and thermostatic means independent of said first named thermostatic means to move said valve member to its closed position and to cooperate with said first named thermostatic means to open said valve member with a snap movement.

5. A thermostatic valve comprising, a valve body having a valve port formed therein, a valve member cooperating with said valve port, a valve stem connected to one side of said valve member, a thermostatic element connected to said valve stem, a second valve stem connected to the opposite side of said valve member, and snap action operating means adapted to move into engagement and disengagement with said second valve stem to close the valve and to permit said thermostatic element to open said valve.

6. A thermostatic valve comprising, a valve body having a valve port formed therein, a valve member cooperating with said valve port, a valve stem connected to one side of said valve member, a thermostatic element connected to said valve stem, a second valve stem connected to the opposite side of said valve member, snap action operating means adapted to be moved into engagement and disengagement with said second valve stem to close the valve and to permit said thermostatic element to open said valve, means for moving said snap-action operating means, and means for supplying heat to said thermostatic element.

7. A thermostatic valve comprising, a valve body having a valve port formed therein, a valve member cooperating with said valve port, a valve stem connected to said valve member, snap action means associated with said valve stem to effect the movement of said valve member to an open or a closed valve position, thermostatic means to shift said snap action mechanism through the initial portion of its throw, said thermostatic means functioning at times to positively move said snap action mechanism, valve stem and valve member, and thermostatic device independent of said thermostatic means to move said valve member to its closed valve position and to cooperate with said thermostatic means to effect the opening movement of said valve member with a snap movement.

8. A thermostatic valve comprising, a valve body having a valve port formed therein, a valve member cooperating with said valve port, a valve stem connected to one side of said valve member, a thermostatic element connected to said valve stem, a second valve stem connected to the opposite side of said valve member, snap action means adapted to be moved into engagement and disengagement with said second valve stem to close the valve and to permit said thermostatic element to open said valve, and thermostatic means for effecting the operation of said snap-action means comprising a compounding lever, a temperature responsive tube having a high coefficient of thermal expansion, a temperature responsive rod having a low coefficient of expansion, a thermostat housing supporting one end of said tube, said rod being supported in the other end of said tube, and a fulcrum lever supported by said housing in operative engagement with said rod at one end and operatively connected at its other end to said snap action mechanism.

9. In a thermostatic valve, a thermostatic actuator, valve means adapted to be operated thereby, snap-action mechanism interposed between said actuator and said valve means having a lost-motion connection with said actuator adapted normally to utilize the gradual movement of the thermostatic actuator to effect the opening or closing operation of the valve with a snap movement and under abnormal conditions to provide a direct connection between said actuator and said valve means for effecting the closure of the valve, and supplemental means cooperating with said actuator and said snap-action mechanism for effecting the opening movement of said valve means, said thermostatic means being further adapted to effect the closing movement of said valve means independently of said actuator and said snap-action mechanism.

10. In a snap acting valve, an actuator therefor, valve means adapted to be operated thereby, snap-action mechanism loosely coupled with said actuator adapted to be positively moved thereby over the initial portion of its stroke and to complete its stroke unaided by said actuator to effect the operation of said valve means with a snap movement and arranged to provide under certain conditions a direct connection between said actuator and said valve means for the closing operation thereof, and thermostatic means cooperating with said actuator and said snap-action mechanism for effecting the opening movement of said valve means, said thermostatic means being further adapted to effect the closing movement of said valve means independently of said actuator and said snap-action mechanism.

11. A safety fuel control for heaters comprising the combination with a fuel supply, and a burner and a pilot both supplied thereby, of a fuel line from the supply to the burner, a valve in said line, a thermostat operatively associated with said valve and subject to the heat generated by said burner, and a second thermostat operatively associated with said valve and subject to the heat of said pilot, one of said thermostats having a permanent operating connection with said valve and arranged to be overpowered by the other of said thermostats for effecting the closure of said valve.

12. A safety fuel control for heaters comprising the combination with a fuel supply, and a burner and a pilot both supplied thereby, of a fuel line from the supply to the burner, a valve in said line, a thermostat operatively associated with said valve and subject to the heat generated by said burner, and a second thermostat operatively associated with said valve and subject to the heat of said pilot, one of said thermostats having a permanent operating connection with said valve and constructed so as to provide a relatively flexible and yielding operating element therefor, the other of said thermostats being of less flexible construction than the aforesaid thermostat and having sufficient strength to overpower the same for effecting the closure of said valve in opposition to the force exerted by said relatively flexible and yielding thermostat.

13. A control device comprising the combination of a housing, a valve within the housing cooperating with a seat therein, temperature responsive means operable to vary the position of the valve with relation to its seat as temperature changes occur, a transmitting element consisting of two relatively adjustable members disposed one within the other, one member being engaged by said temperature responsive means and the other member engaging said valve, means engaging said valve engaging member for preventing rotation thereof, and means operatively connected to said valve engaging member entering the housing and operable from the outside thereof.

14. A control device comprising the combination of a housing, a valve within the housing cooperating with a seat therein, temperature responsive means operable to vary the position of the valve with relation to its seat as temperature changes occur, a transmitting element consisting of two relatively adjustable members disposed one within the other, one member being engaged by said temperature responsive means and the other member engaging said valve, means engaging said valve engaging member for preventing rotation thereof, and means operatively connected to said valve engaging member arranged on the opposite side of said valve and extending through said casing so as to be accessible from the exterior thereof.

15. In an automatic valve, a valve stem, thermally responsive means for actuating the stem in a plurality of directions and thermally responsive means associated with said first named thermally responsive means to release the valve stem for movement quickly in one direction.

In testimony whereof I affix my signature.

EDMUND J. TE PAS.